(No Model.)  
J. B. ARCHER.  
APPARATUS FOR THE MANUFACTURE OF GAS.  
6 Sheets—Sheet 1.

No. 433,926. Patented Aug. 5, 1890.

Fig. 1.

Witnesses  
Inventor  
John B. Archer  
by C. S. Whitman  
Attorney (No Model.) 6 Sheets—Sheet 4.

J. B. ARCHER.
APPARATUS FOR THE MANUFACTURE OF GAS.

No. 433,926. Patented Aug. 5, 1890.

Witnesses

Inventor
John B. Archer
Attorney (No Model.)  6 Sheets—Sheet 5.
J. B. ARCHER.
APPARATUS FOR THE MANUFACTURE OF GAS.

No. 433,926.  Patented Aug. 5, 1890.

(No Model.) 6 Sheets—Sheet 6.

J. B. ARCHER.
APPARATUS FOR THE MANUFACTURE OF GAS.

No. 433,926. Patented Aug. 5, 1890.

Fig. 9.

Witnesses
Inventor
John B. Archer
Attorney

UNITED STATES PATENT OFFICE.

JOHN B. ARCHER, OF WASHINGTON, DISTRICT OF COLUMBIA.

APPARATUS FOR THE MANUFACTURE OF GAS.

SPECIFICATION forming part of Letters Patent No. 433,926, dated August 5, 1890.

Application filed November 2, 1889. Serial No. 329,034. (No model.)

*To all whom it may concern:*

Be it known that I, JOHN B. ARCHER, a citizen of the United States, residing at Washington, in the District of Columbia, have invented certain new and useful Improvements in Apparatus for the Manufacture of Gas; and I do hereby declare the following to be a full, clear, and exact description of the invention, such as will enable others skilled in the art to which it appertains to make and use the same.

My invention relates to the manufacture of gas according to that class of processes in which the interdecomposition of oil and water is effected, and in which the gaseous products in a measure result from the interaction of steam and carbon; and my invention consists in an improved apparatus for the economical manufacture of gas by converting, in a gradual manner, steam or vapor of water and hydrocarbon oil into a fuel-gas that may be used in furnaces for forging, welding, crucible steel-melting, and other metallurgical processes, burning brick, pottery, tile, lime, cement, &c., and for firing boilers, the conversion being accomplished by the aid of certain new and useful devices and combinations to be hereinafter described and claimed.

In the accompanying drawings, in which similar letters refer to similar parts throughout the several views thereof.

The upper portion of the interior of the brick-work furnace structure Z is divided into two compartments—the inner and outer ones—by the annular wall $A^9$, inclosing the coil of pipe A, the top of the wall being considerably below the under surface of the removable tiles $a^2$, the outer edges of which rest upon the brick-work furnace structure and the inner edges upon a flange $d$ of the removable cap-piece $D^2$ of the vertical retort.

In two opposite sides of the outer compartment of the brick-work structure are placed the horizontal retorts B B, in gangs of three, and in two remaining opposite sides of the same compartment are similarly placed the superheater-pipes R R, also in gangs of three, the said outer compartment communicating with the inner one, in which are placed the inner coiled superheating-pipe C and the vertical retort D by means of the opening between the top of the annular wall $A^9$ and the under surfaces of the tiles $a^2$. In the middle of the bottom of the central recess which is formed in the brick-work structure and which extends to the top thereof is the tubular support E, upon which rests the retort D. The protectors E' E', surrounding the lower part of the retort D, are of steel, cast-iron, or other refractory material, and are made in two or more pieces, in order that they may be removed as often as desired. They serve to protect the lower portion of the retort from the direct action of the fire.

Figure 7:
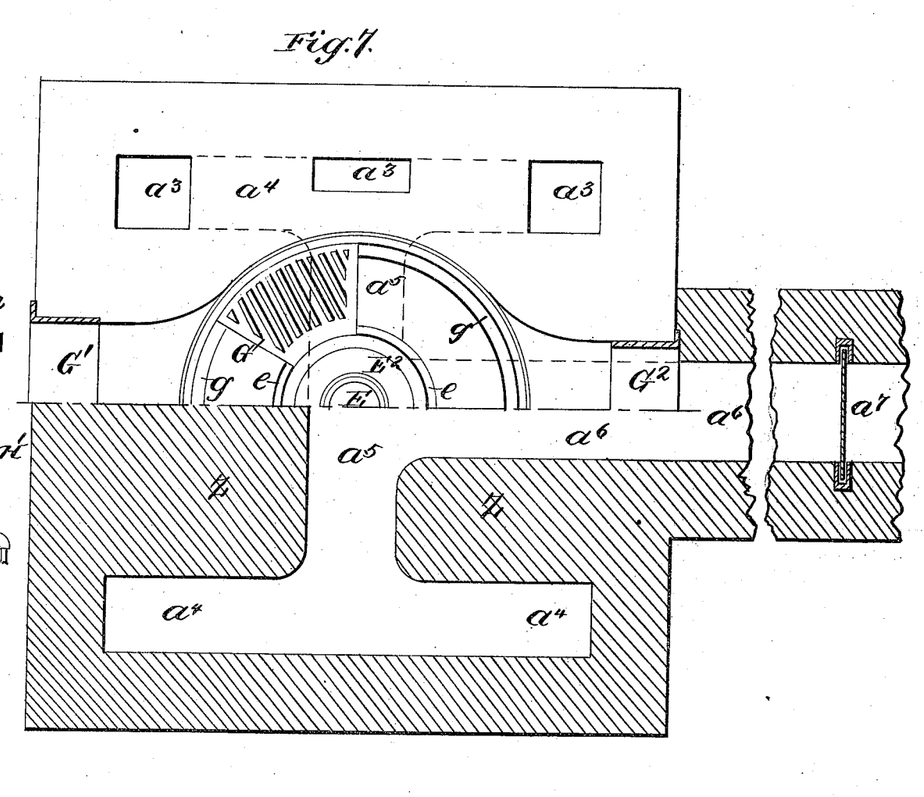
Fig. 7 is a combined plan at the grate-bars and sectional plan through the flues of the producer, showing the grate and flue arrangements.
Figure 8:
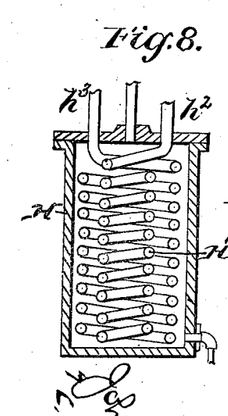
Fig. 8 is a vertical section of the oil-heater, showing its double coil.
Figure 9:
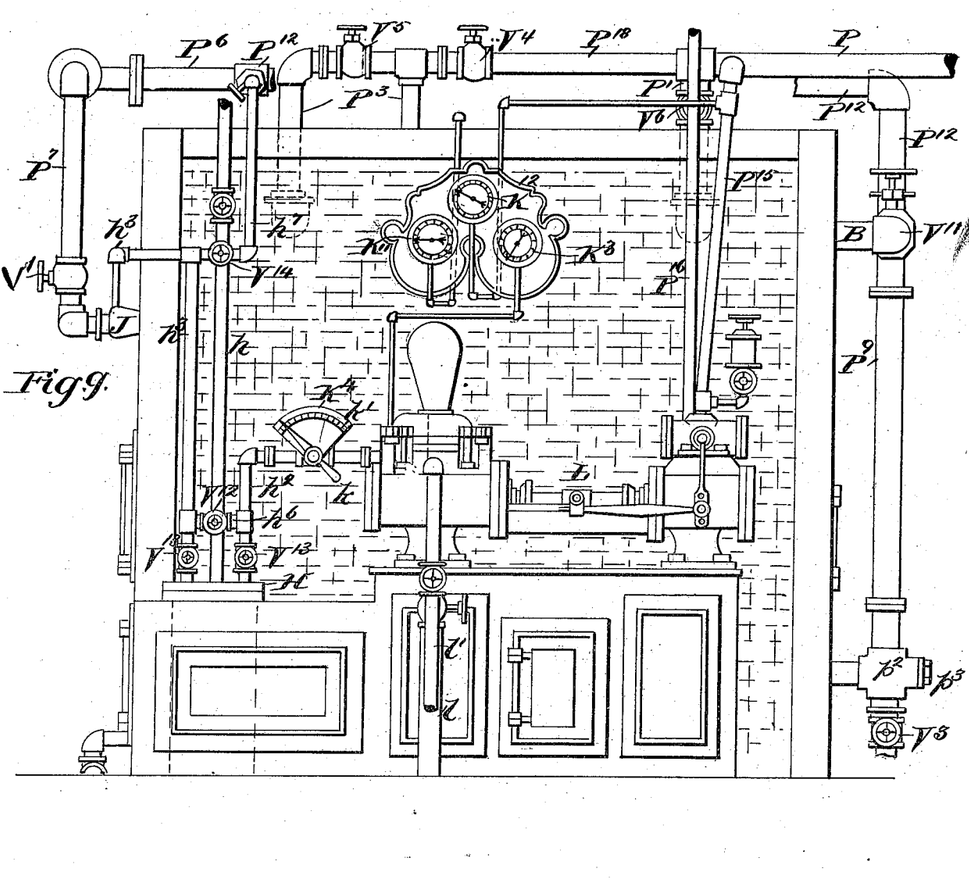
Fig. 9 is an elevation of a different side of the producer from that shown in Fig. 2.

The grate-bars G are supported at their outer ends by a metal ring $g$, contained in the annular recess formed by the shoulder $g'$ on the brick-work, and are supported at their inner ends by the flange $e$ of the ring E', which rests upon the support E. They consist of several pieces all alike and segmental in form, which, when united, form an annular grate-surface surrounding the central retort D. (See Fig. 7.)

The inner surface of the brick-work structure surrounding the grate is nearly cylindrical, it having a slight inward pitch as it rises from the grate-surface, forming an annular fire-back, and upon it rests the annular wall $A^9$. The fire-box thus formed, which opens upwardly into the inner compartment, is provided with two lateral openings G' and $G^2$, which are respectively closed by doors, as shown, while a corresponding opening $G^3$, provided with a similar door, communicates with the ash-pit. The flame and products of combustion from the fire on their way up the central recess and inner compartment heat the vertical retort D and inner coil C, the lower turns of which are surrounded by a ring of iron or steel $c$ cast thereon to protect them from the extreme heat and which rests upon lugs $c'$, formed upon the inner surface of the annular wall $A^9$. After passing through the inner compartment the heated products of combustion are deflected by the tiles $a^2$, and, passing between them and the annular wall $A^9$, descend through the outer compartment to the downtake-flues $a^3$ $a^3$, and thence to the main flues, and so to the stack.

The downtake-flues $a^3$ are six in number, the upper ends of four of which open into the corners of the bottom of the outer compartment, the remaining two opening into the centers of the opposite sides of the same compartments under the horizontal retorts B B, the lower ends of the downtake-flues opening into two parallel horizontal flues $a^4$ $a^4$ in the foundation of the brick-work structure. These are connected at their central points by a cross-flue $a^5$, which opens into the main flue $a^6$, leading to the stack, in which main flue is placed a damper $a^7$, by which the draft is regulated.

Figure 5:
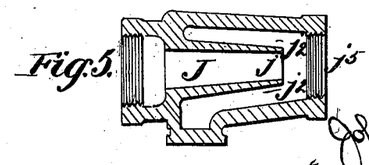
Fig. 5 is a longitudinal central section through one of the injectors.

The pipe P is connected with a suitable steam-supply, and the steam is led thereby to the vertical pipe P', by which it is led to the superheater-pipes R R, those upon the different sides of the outer compartment being connected by the pipe $P^2$. Thence it is conducted by the pipe $P^3$ to the upper end of the coil A, passing therethrough and emerging by the pipe $P^4$, which it ascends. The pipe $P^4$, as is also the pipe $P^3$, is protected from extreme heat by the projection $a^8$, formed upon the side of the wall $A^9$ and extending above the top thereof to the level of the upper surface of the tiles $a^2$. From the upper end of the pipe $P^4$ the steam is conducted by the pipe $P^5$ through the regulating-valve V to the upper end of the inner superheating-coil C, where it is highly heated, and from the lower turns of which it is led by the pipe $P^6$ to the Y-piece Y, where it divides, passing through the branch pipes $P^7$ to the injectors J J, the construction of which is shown in Fig. 5.

As the steam passes into the injector and through the nozzle $j$, a vacuum is formed in the chamber $j^2$, which draws in oil through the orifice $j^3$, from which a pipe extends to the oil forcing and heating apparatus, and the mixed oil and vapor or steam pass together through the exit $j^5$ to the horizontal retorts B B, of which there are by preference three on each side, connected in a continuous series, and in which the oil which has been already heated and atomized by the steam is thoroughly vaporized. The oil that meets the steam in the injectors J J is first heated, and for this purpose the oil-heater H is used. This consists of a cylindrical receptacle, which is supplied with superheated steam by the pipe $h$ leading from the pipe $P^6$. The closed cylinder H contains a double spiral coil H', one end of which is attached to the forcing apparatus or pump L by the pipe $h^2$, while its other end is connected to the pipe $h^3$, having branches $h^4$ $h^4$, by which the oil is led to the injectors. The oil being thus heated in the coils H' by the steam contained in the cylinder H, the relative amounts of oil and steam admitted to the vaporizing-pipes B B are regulated by the valves V' V' in the pipes $P^7$ $P^7$ and the valves $V^2$ $V^2$ in the branch pipes $h^4$ $h^4$, respectively. The gaseous mixtures resulting from the interaction of the steam and oil after leaving the horizontal retorts B B (where the carbon of the oil seizes upon the oxygen of the steam, liberating the hydrogen,) is conducted by the pipes $P^8$ $P^8$ to the Y-piece Y', which is joined to the pipe $P^9$, leading to the bottom of the vertical retort D. Here, by virtue of the high temperature the gaseous mixture is subjected to, it becomes a perfected fuel-gas. It then leaves the retort through the eduction-pipes $P^{10}$, whence it may be conducted to any desired point by means of supply-mains. The gas thus formed is essentially a fuel-gas. When the gas is to be used for illuminating purposes, it is put through a further process, which is described in application Serial No. 326,852, filed by me October 12, 1889.

In the pipe $P^9$, at its lowest point before it turns to pass inward through the brick-work structure to the retort D, I place a cross $p^2$, into the outer extremity of which is screwed a plug $p^3$, which may be removed and so allow of the introduction of a tool into the horizontal portion of the pipe $P^9$, to remove any sediment that may accumulate there, while at the lower extremity of the cross I place a valve $V^3$, which when opened serves as a blow-off to rid the retort D of tar, pitch, or non-volatilizable matter.

Figure 6:
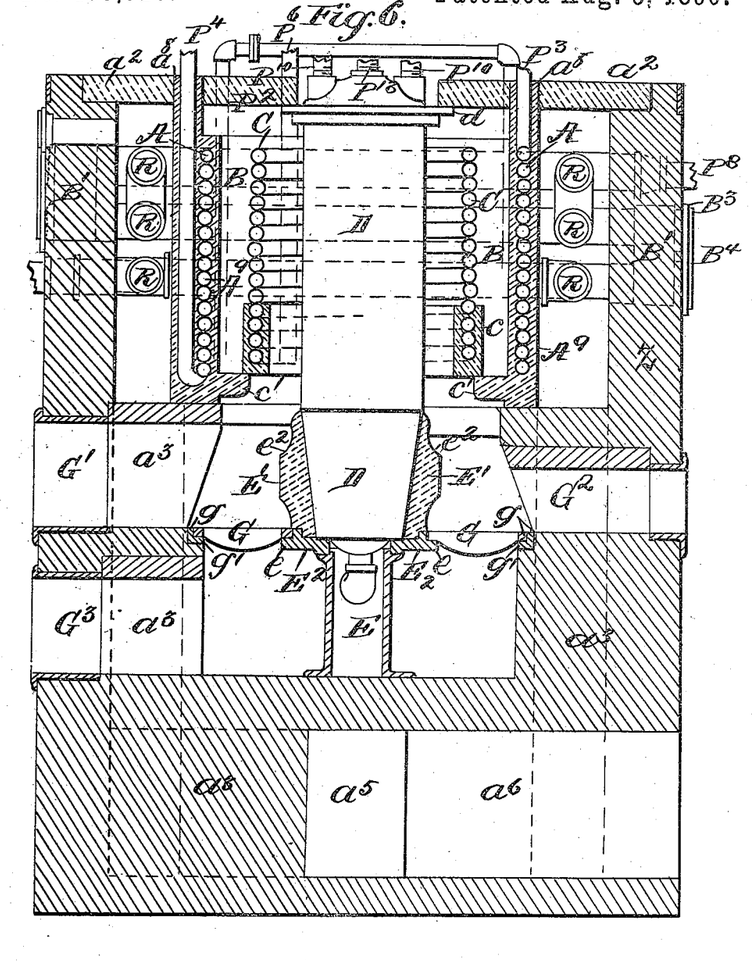
Fig. 6 is a vertical section of the producer, on line $x\ x$ of Fig. 4.

It has been found that the retort-protectors E' burn most rapidly at about the center, where the gases of the combustion of the fuel upon the grate come in contact with the upper air, and to avoid this I make them much thicker at this point, as shown in Fig. 6, the extra thickness taking the form of a ridge $e^2$ running entirely around them about one-third to one-half of their height from the top.

The coil C is preferably constructed as follows: An ordinary extra-heavy iron or steel pipe, about thirty-six millimeters in diameter, or more, if desired, is formed into a close coil of the desired diameter, the upper end thereof being bent upward to connect with the pipe $P^5$, while its lower end is also bent upward, connecting with the pipe $P^6$. The coil being placed in a suitable mold, its three or more lowest turns are covered with iron or steel, which protects them from the direct action of the heat, while the upper or more remote parts of the coil receives the full benefit of contact with the hot gases. Extending from the pipe P to the pipe $P^3$ is a cut-out pipe $P^{18}$, provided with a valve $V^4$, by opening which and closing the valves $V^5$ and $V^6$ in the pipes $P^3$ and $P'$, respectively, the steam is made to pass directly from pipe P to the pipe $P^3$ and outer coil A, avoiding the superheater-pipes R R, which are thereby cut out. Extending from the pipe $P^6$ to the pipe $P^4$ is a cut-out pipe $P^{11}$, provided with a valve $V^7$, by opening which and closing the valves V and $V^8$, the latter being in the pipe $P^6$, the steam is made to pass directly from the outer coil through pipes $P^4$ $P^{11}$ $P^6$ to the Y-piece Y, thus avoiding the inner coil C, which is thereby cut out. Extending from the pipe $P^6$ to the pipe $P^8$ is the cut-out pipe $P^{12}$, provided both the valves $V^9$ and $V^{10}$, by opening which and closing the valves $V'$ $V'$ and $V^{11}$ $V^{11}$, the latter in the branch pipe $P^8$, the steam is made to pass from the inner superheating-coil C through the pipes $P^6$ $P^{12}$ $P^8$ $P^9$ directly to the retort D, avoiding the vaporizer-pipes B B, which are thereby cut out. Extending from the pipe $h^2$ to the pipe $h^3$ is a cut-out pipe $h^6$, provided with a valve $V^{12}$, by opening which and closing the valves $V^{13}$ $V^{13}$ in the pipes $h^2$ and $h^3$ the oil is conducted from the pump directly to the pipe $h^3$ and injectors J and J, avoiding the oil-heater, which is thereby cut out. From the pipe $h^3$ there extends a pipe $h^7$, that enters the cut-out pipe $P^{12}$. This pipe is provided with a valve $V^{14}$, and serves to supply oil to the pipe $P^{12}$ through the injector $h^8$, located at their junction when the injectors J J are cut out. These various cut-outs serve to guard against the failing of any of the parts of this producer from the extreme high temperature at which it is necessarily run, or from other causes not necessary to mention, and by their presence the probability of delays or accidents that would compel a shut-down is reduced to a minimum. From the pipe $B^{11}$ to the upper portion of the vertical retort D there extends a pipe $P^{13}$, provided with a valve $V^{14}$, by opening which superheated steam from the inner superheater-coil C may be introduced into the retort D.

The regulating-valve V is a conical plug-valve, and is placed within the pipe connecting the outer coil A and the inner superheater-coil C, and serves to regulate the amount of steam admitted to the coil C, and through it to the producer. It is opened and closed by a lever K. Its position is indicated by the pointer $K'$, moving on the graduated arc $K^2$, each division of which represents an aliquot part of the entire opening in the valve V.

Figure 1:
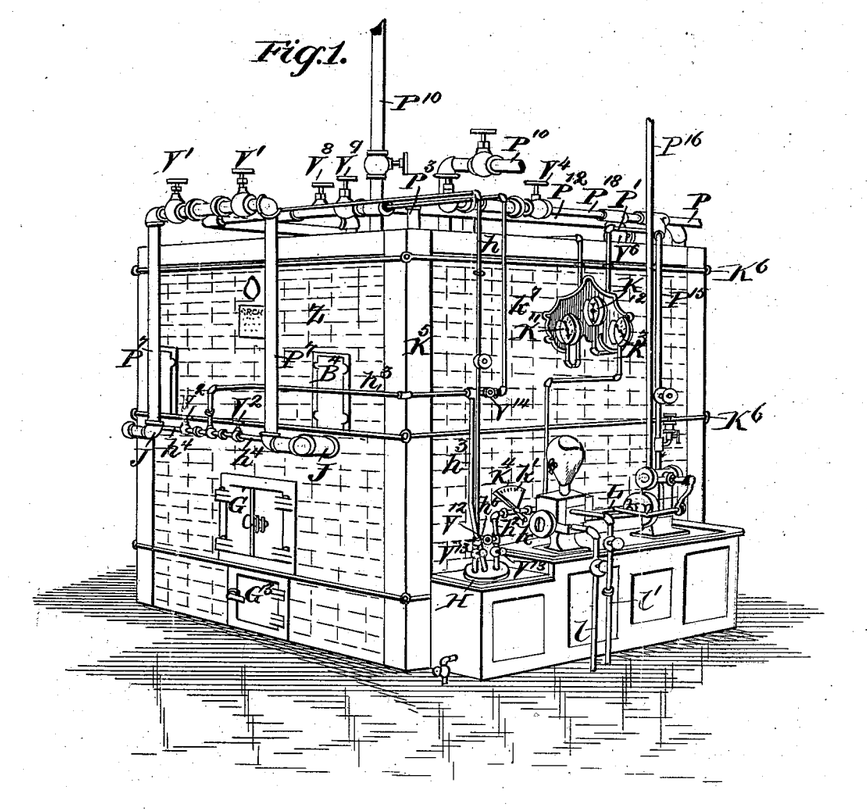
Figure 1 is a perspective view of the gas-producer embodying my improvements.
Figure 2:
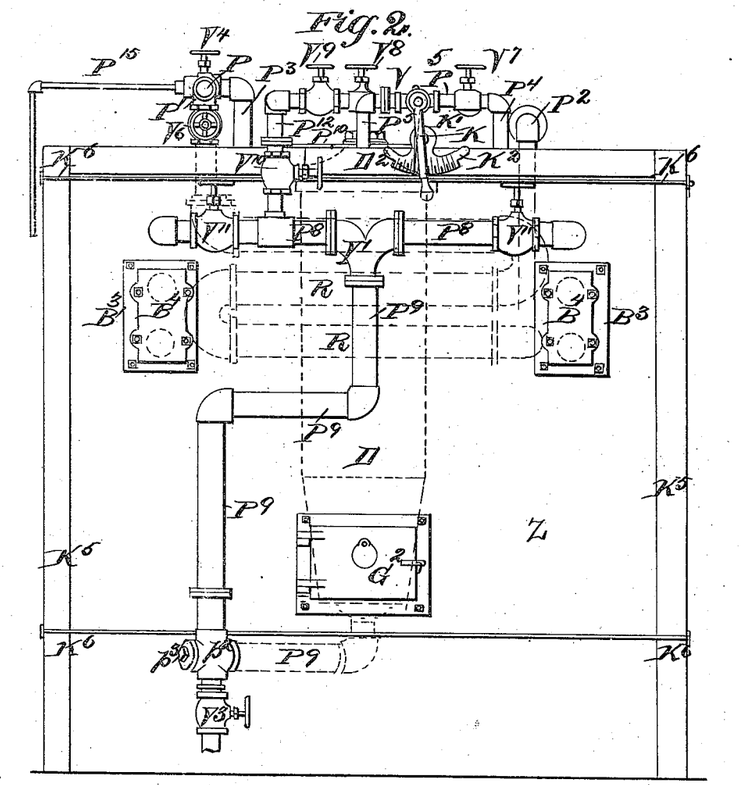
Fig. 2 is an elevation of one side of the same, showing pipe-connections, &c.
Figure 3:
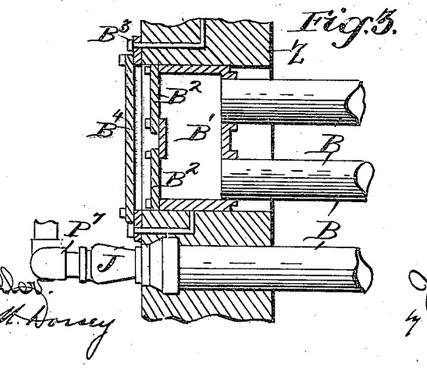
Fig. 3 is a vertical longitudinal section through the ends of one set of horizontal retorts, showing the return-boxes, injectors, &c.
Figure 4:
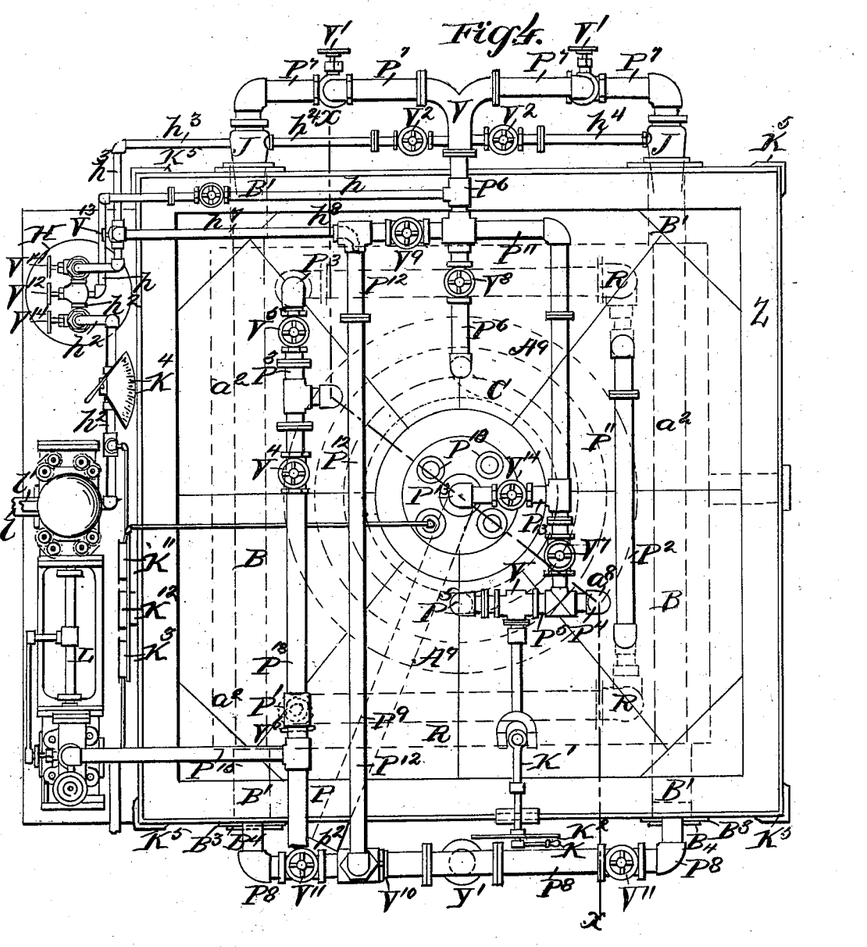
Fig. 4 is a plan view of the producer, showing pipe-connections, cut-outs, &c.

The oil is supplied to the pump L through the suction-pipe $l$, and passes thence to the oil-heater through the pipe $h^2$, the excess being returned to the tank by the overflow-pipe $l'$, Fig. 1. A gage $K^3$ serves to indicate the oil-pressure in the pipe $h^2$, and gages $K^{11}$ $K^{12}$ indicating the gas and steam pressures, respectively. The admission of the oil to the producer is regulated by the hair-valve $K^4$, which consists of a specially-designed plug-valve having a rectangular slit, through which the oil passes, the opening in which is indicated by a pointer $k$, traveling on a graduated arc $k'$. Steam is supplied to the pump by the pipe $P^{15}$, and the exhaust-steam is removed by the pipe $P^{16}$.

The horizontal retorts B B are provided with return-boxes $B'$ $B'$. These consist of a rectangular box, into the back of which the horizontal retorts screw, and which are laterally inclosed in the brick walls of the producer. The fronts of the boxes $B'$ are closed by plates $B^2$, each plate being opposite to the extremity of its pipe, as shown. The opening in the wall in which the box is set is outwardly closed by a frame $B^3$ and door $B^4$, the frame being attached to the wall by anchor-bolts or other suitable fastenings, and the doors being removable, fastened to the frame by bolts or otherwise.

By removing the doors $B^4$ and plates $B^2$ access may be had to the interior of the horizontal retorts B.

The producer is provided with corner-irons $K^5$ and tie-rods $K^6$ to hold it firmly together. The wall and other masonry are preferably constructed of fire-brick, or the outer wall, for special purposes, of iron or steel plates, as may be also the inner flues, while the pipe-connections, fitting, and valves are of iron, in order to withstand the high heat at which the producer is run.

In the present application I do not desire to claim the process of manufacturing gas disclosed herein; but I make such process the subject of another application filed by me November 2, 1889, and serially numbered 329,035.

Having thus described my invention, what I claim, and desire to secure by Letters Patent, is—

1. In a gas-generator, an annular fire-box provided with a grate and an ash-pit, a vertical retort above the center of the said grate and extending to the top of the generator, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a covering for the generator extending from the said outer wall to the top of the central vertical retort, but clearing said annular wall and leaving a flue above the same, a wall of masonry below said outer and annular walls, having flues extending downward therethrough from the space between the said walls, and an eduction-passage below the said generator for the products of combustion connected with the said flues, as and for the purposes described.

2. In a gas-generator, an annular fire-box provided with a grate and an ash-pit, a vertical retort above the center of the said grate and extending to the top of the generator, a coil of pipe around the upper portion of said retort and above the fire-box, an annular fire-back surrounding the lower part of the fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a covering for the generator extending from the said outer wall to the top of the central vertical retort, but clearing said annular wall and leaving a flue above the same, a wall of masonry below said outer and annular walls having flues extending downward therethrough from the space between the said walls, a passage below the said generator connected with the said flues and serving as an eduction-passage for the products of combustion, a steam-supply pipe connected with the said outer coiled pipe, and pipes connecting the outer and inner coils and the horizontal and the vertical retorts together, as and for the purposes described.

3. In a gas-generator, an annular fire-box provided with a grate and an ash-pit, a vertical retort above the center of the said grate and extending to the top of the generator, a protective metal casing around the base of the vertical retort, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a covering for the generator extending from the said outer wall to the top of the central vertical retort, but clearing said annular wall and leaving a flue above the same, a wall of masonry below said outer and annular walls having flues extending downward therethrough from the space between the said walls, a passage below the said generator connected with the said flues and serving as an eduction-passage for the products of combustion, a steam-supply pipe connected with the said outer coiled pipe, and pipes connecting the outer and inner coils and the horizontal and vertical retorts together, as and for the purposes described.

4. In a gas-generator, an annular fire-box provided with a grate and an ash-pit, a vertical retort above the center of the said grate and extending to the top of the generator, a protective metal casing around the base of the vertical retort, a coil of pipe around the upper portion of said retort and above the fire-box, having its lower turns covered by a protective casing, an annular fire-back surrounding the lower part of the said fire-box, an annular wall above said annular fire-back extending nearly to the top of the generator, an outer coiled pipe inclosed within the body of the said annular wall, a square outer-wall or casing for the generator outside of said annular wall, horizontal retorts extending through the space between said annular and said outer walls, a covering for the generator extending from the said outer walls to the top of the central vertical retort, but clearing said annular wall and leaving a flue above the same, a wall of masonry below said outer and annular walls having flues extending downward therethrough from the space between the said walls, a passage below the said generator connected with the said flues and serving as an eduction-passage for the products of combustion, a steam-supply pipe connected with the said outer coiled pipe, and pipes connecting the outer and inner coils and the horizontal and vertical retorts together, as and for the purposes described.

5. In a gas-generator, an annular fire-box provided with a grate and an ash-pit, a vertical retort above the center of the said grate and extending to the top of the generator, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a removable cap for the vertical retort having a flange thereon, removable tiles forming a covering for the generator, the outer ends of which rest upon the outer wall and their inner edges upon the flange of the removable cap, a steam-supply pipe connected with the said outer coiled pipe, and pipes connecting the outer and inner coils and the horizontal and vertical retorts together, as and for the purposes described.

6. In a gas-generator, an annular fire-box provided with a grate and an ash-pit, a vertical retort above the center of the said grate and extending to the top of the generator, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, vaporizing-pipes horizontally placed in the space between the annular and outer walls and upon opposite sides thereof, a steam-supply pipe connected to the said vaporizing-pipes, and pipes connecting the vaporizing-pipes, the outer and inner coils, and the horizontal and vertical retorts together, as and for the purposes described.

7. In a gas-generator, an annular fire-box provided with a grate and an ash-pit, a vertical retort above the center of the said grate and extending to the top of the generator, a tubular support upon which the retort and grate-bars rest, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a covering for the generator extending from the said outer wall to the top of the central vertical retort, but clearing said annular wall and leaving a flue above the same, a wall of masonry below said outer and annular walls, having flues extending downward therethrough from the space between the said walls, a passage below the said generator connected with the said flues and serving as an eduction-passage for the products of combustion, a steam-supply pipe connected with the said outer coiled pipe, and pipes connecting the outer and inner coils, and the horizontal and vertical retorts together, as and for the purposes described.

8. In a gas-generator, an annular fire-box provided with a grate and an ash-pit, a vertical retort above the center of the said grate and extending to the top of the generator, a tubular support upon which the retort and grate-bars rest, protectors surrounding the lower part of the retort and constructed of two or more pieces of refractory material, a coil of pipe around the upper portion of said retort and above the fire-box, an annular fire-back surrounding the lower part of the said fire-box, an annular wall above said annular fire-back extending nearly to the top of the generator, an outer coiled pipe inclosed within the body of the said annular wall, a square outer wall or casing for the generator outside of said annular wall, horizontal retorts extending through the space between said annular and said outer walls, a covering for the generator extending from the said outer wall to the top of the central vertical retort, but clearing said annular wall and leaving a flue above the same, a wall of masonry below said outer and annular walls having flues extending downward therethrough from the space between the said walls, a passage below the said generator connected with the said flues and serving as an eduction-passage for the products of combustion, a steam-supply pipe connected with the said outer coiled pipe, and pipes connecting the outer and inner coils and the horizontal and vertical retorts together, as and for the purposes described.

9. In a gas-generator, the combination of a vertical retort, a tubular support for the vertical retort arranged below the center of the vertical retort, a ring resting on the said tubular support, a series of grate-bars, the inner edges of which rest upon said ring, a vapor-induction pipe and gas-eduction pipe, each connected with the vertical retort, means for supplying oil and water vapors to said vapor-induction pipe, and a series of protecting-tiles arranged about the base of the retort and supported by the tubular support, as and for the purposes described.

10. In a gas-generator, the combination of a brick-work furnace structure, an upright annular wall, a vertical retort within the space embraced by the annular wall, a tubular support for the vertical retort arranged below the center of the retort, a ring resting on the said tubular support, a series of grate-bars, the inner edges of which rest upon the said ring, a vapor-induction pipe and gas-eduction pipe, each connected with the vertical retort, means for supplying oil and water vapors to said vapor-induction pipe, and a series of protecting-tiles arranged about the base of the retort and supported by the tubular support, as and for the purposes described.

11. In a gas-generator, the combination of horizontal vaporizing-pipes communicating with each other, a steam-supply pipe leading thereto, a vertical retort, a tubular support for the vertical retort, arranged below the center of the vertical retort, a ring resting on the said tubular support, a series of grate-bars, the inner edges of which rest upon the said ring, a vapor-induction pipe and gas-eduction pipe, each connected with the vertical retort, means for supplying oil and water vapors to said vapor-induction pipe, and a series of protecting-tiles arranged about the base of the retort and supported by the tubular support, as and for the purposes described.

12. In a gas-generator, the combination of a fire-box, horizontal steam-superheaters consisting of chambers communicating with each other, a steam-supply pipe leading to the said superheaters, an outer coil of pipe arranged above the fire-box, an inner spiral superheating-coil, also above the fire-box, a horizontal retort, an oil-induction pipe connected with the said retort, and pipes connecting the superheaters with the outer coil, the outer coil with the inner coil, and the inner coil with the horizontal retort, and an eduction-pipe leading from the horizontal retort, as and for the purposes described.

13. In a gas-generator, the combination of a fire-box, a horizontal steam-superheater, a steam-supply pipe leading to said superheater, an outer coil of pipe arranged above the fire-box, a pipe connecting the said coil with the superheater, an inner spiral steam-superheating coil, also above the fire-box, a pipe connecting the outer and inner coils, a horizontal retort, a pipe connecting the inner spiral superheating-coils with the horizontal retort, an oil-heater, a pipe connecting the oil-heater and horizontal retort, and an eduction-pipe from the horizontal retort, as and for the purposes described.

14. In a gas-generator, the combination of a fire-box, a horizontal steam-superheater, a steam-supply pipe leading thereto, an outer coil of pipe arranged above the fire-box, a pipe connecting the said coil with the superheater, an inner spiral superheating-coil, also above the fire-box, a pipe connecting the outer and inner coils, horizontal retorts, pipes and branch pipes connecting the inner spiral superheating-coils with the horizontal retorts, an oil-heater, pipes connecting the oil-heater with the said branch pipes, and injectors located at the junction of the two last-named pipes, as and for the purposes described.

15. In a gas-generator, the combination of a fire-box, horizontal steam-superheaters consisting of chambers communicating with each other, a steam-supply pipe leading to said superheater, an outer coil of pipe arranged above the fire-box, a pipe connecting the said coil with the superheater, an inner spiral superheating-coil, also above the fire-box, a pipe connecting the outer and inner coils, horizontal retorts, pipes and branch pipes connecting the inner spiral superheating-coils with the horizontal retorts, an oil-heater, pipes connecting the oil-heater with the said branch pipe, injectors located at the junction of the two last-named pipes, a vertical retort, pipes leading from the horizontal retorts to the top of the vertical retort, and a gas-eduction pipe connected with the vertical retort, as and for the purposes described.

16. In a gas-generator, the combination of a vertical retort, vapor-induction and gas-eduction pipes connected therewith, a cap-piece upon the said retort, removable tiles, the inner edges of which rest upon the outer edges of the cap-piece, and means for supplying oil and water vapor to the induction-pipe, as and for the purposes described.

17. The combination of a masonry furnace structure, an upright annular wall dividing the upper portion of the interior of the furnace structure, an outer spiral coil of pipe contained within the body of the said wall, an inner spiral steam-superheating coil and vertical retort within the space inclosed by the said annular wall, a horizontal retort in the space outside of the said wall, pipes connecting the outer coil of pipe, the inner spiral superheater, and the horizontal and vertical retorts together, a gas-eduction pipe connected with the vertical retort, a steam-supply pipe connected with the said outer coil of pipe, an oil-supply pipe connected with the horizontal retort, a fire-box below the space inclosed by the annular wall, a chimney, and flues within the furnace structure communicating between the space inclosed by the annular wall and the space outside of said wall and between the last-named space and the chimney, as and for the purposes described.

18. In a gas-generator, the combination, with a chamber having a vertical retort and a generator of heat contained therein, of a second chamber having a horizontal retort contained therein, steam and oil supply pipes connected with the horizontal retort, a pipe connecting the horizontal retort with the vertical retort, a gas-eduction pipe connected with the vertical retort, a flue connecting the two said chambers together, and an escape-flue for the products of combustion communicating with the last-named chamber, as described.

19. In a gas-generator, the combination, with a chamber having a vertical retort and a generator of heat contained therein, of a second chamber having a horizontal retort contained therein, an injector having steam and oil supply pipes connected therewith communicating with the horizontal retort, the mouth of the said oil-supply pipe being surrounded by the mouth of the steam-supply pipe, whereby the oil is injected into the horizontal retort and atomized, a pipe connecting the horizontal retort with the vertical retort, a flue connecting the two said chambers together, and an escape-flue for the products of combustion communicating with the last-named chamber, as described.

In testimony whereof I affix my signature in presence of two witnesses.

JOHN B. ARCHER.

Witnesses:
VERNON MARTIN DORSEY,
C. F. KELLER.